United States Patent [19]

Dombrowski

[11] 4,399,724
[45] Aug. 23, 1983

[54] LATHE MACHINE FOR TURNING WHEEL SETS, ESPECIALLY SETS OF RAILROAD WHEELS

[75] Inventor: Theodor Dombrowski, Erkelenz, Fed. Rep. of Germany

[73] Assignee: Wilhelm Hegenscheidt Gesellschaft mgH, Erkelenz, Fed. Rep. of Germany

[21] Appl. No.: 231,598

[22] Filed: Feb. 5, 1981

[30] Foreign Application Priority Data

Apr. 3, 1980 [DE] Fed. Rep. of Germany ....... 3012997

[51] Int. Cl.³ .............................................. B23B 5/32
[52] U.S. Cl. ............................................. 82/8; 82/4 E
[58] Field of Search ..................................... 82/8, 4 E

[56] References Cited

U.S. PATENT DOCUMENTS 2,823,493  2/1958  Stanley ................................. 82/8 X
3,839,932  10/1974  Dombrowski ............................ 82/8

FOREIGN PATENT DOCUMENTS 1154332  9/1963  Fed. Rep. of Germany ............ 82/8
2424305  11/1975  Fed. Rep. of Germany .
78173  9/1975  Poland .

Primary Examiner—James M. Meister
Attorney, Agent, or Firm—W. G. Fasse; D. H. Kane, Jr.

[57] ABSTRACT

A milling machine for turning sets of wheels, especially railroad wheels, comprises at least one roller contacting the wheel circumference and at least one roller contacting the axially inwardly facing wheel surface for driving and/or supporting the wheels of a set. The circumferential roller and the inner roller for the same wheel are operatively supported by a common support such as a common housing whereby axial forces are taken up reliably so that axial excursions of the wheel set are prevented.

9 Claims, 8 Drawing Figures

LATHE MACHINE FOR TURNING WHEEL SETS, ESPECIALLY SETS OF RAILROAD WHEELS

BACKGROUND OF THE INVENTION

The present invention relates to a lathe machine for turning wheel sets, especially sets of railroad wheels. Such milling machines operate in the manner of a lathe for reprofiling wheel sets and comprise roller means for driving and/or supporting a wheel set at the circumference thereof and at the wheel surface facing axially inwardly. An axially inwardly facing wheel surface faces the respectively axially inwardly facing surface of the other wheel forming a set. A wheel set has a common rotational axle. Machines of the above described type are known in the art and are described, for example, in Polish Pat. No. 78,173 or in German Patent Publication (DE-AS) 2,424,305.

Polish Pat. No. 78,173 discloses a wheel set milling machine or lathe which is referred to as an underfloor milling machine because its primary components are installed below the floor level of a machine shop. Such a machine comprises first roller means arranged for contacting the circumference of a wheel of a wheel set and second roller means arranged for contacting the inwardly facing surface of the wheels of a set, whereby at least the circumference contacting roller means drive the wheels of a set and whereby the inwardly facing surface contacting rollers are supposed to provide an alignment and guidance in the axial direction of the wheel set. The axial direction of a wheel set in this context is simultaneously the rotational axis of such a wheel set. In this prior art machine one set of rollers contacting an inwardly facing lateral wheel surface is supported in a rigid position while the other corresponding roller set which contacts the opposite inwardly facing lateral wheel surface is adjustable by hydraulic means. This type of arrangement has the inherent drawback that the wheel disks could be bent apart in the axial direction by the hydraulic adjustment of one of the second roller means so that when the wheel set is reprofiled a distorted profile may result. Another drawback of this type of arrangement is seen in that the opposite, rigidly positioned second roller set contacting an inner lateral wheel surface does not always provide the required counter support for the wheels, especially where the loads resulting from the reprofiling should vary. Thus, it is possible that the wheel set is subject to lateral excursions during the milling or machining or turning operation which again would result in an unsatifactory reprofiling operation.

The roller arrangement as disclosed in German Patent Publication 2,424,305 is not at all capable of taking up externally applied axially effective forces.

During the machining or milling operation substantially three types of axial forces are effective in the axial direction of a wheel set. The first type of axial force components is caused by the frictional forces which may result due to the fact that the rotational axes of the rollers contacting the circumference of the wheels do not extend precisely in parallel relative to one another. The second type of axial force components is caused by the geometrical shape of the instantaneous point of contact between the wheel surface and the respective roller which changes as the wheel rotates. The third type of axial force components comprises force components resulting from the cutting force. The just enumerated axial force components are effective to a substantial extent in a cumulative manner so that the total axial force may be rather substantial. Further, the just enumerated forces causing the axial force components cannot be measured in an economical way with regard to their size and direction. Thus, it has been common practice heretofore that the size of the required counterforce has been determined on the basis of empirical values. However, such empirical values are not satisfactory under all operating conditions and are therefore disadvantageous.

OBJECTS OF THE INVENTION

In view of the foregoing it is the aim of the invention to achieve the following objects singly or in combination:

to construct a wheel set lathe or milling machine so that the occurring axial force components are taken up reliably under all operating conditions to thereby prevent axial excursions of the wheel set;

to prevent subjecting the wheel set during its reprofiling to bending and/or displacement load components;

to facilitate the positioning or adjustment of the roller means relative to the spacing or gauge of the wheels of a set;

to take up axial force components at the location where they occur to thereby prevent subjecting the wheel disk to moment loads;

to support a pair of rollers comprising a circumference contacting first roller and a lateral wheel surface contacting second roller in common relative to each other, but independently of all other similar roller pairs;

to simplify the roller construction and/or roller shape; and to optimize the rolling contact relationship, particularly between the rollers which contact the axially inwardly facing lateral wheel surface and said lateral wheel surface.

SUMMARY OF THE INVENTION

According to the invention there is provided a milling machine of the lathe type for turning wheel sets, especially railroad wheel sets having a common axis, which is characterized by first roller means for contacting the circumference of one wheel of said wheel set and second roller means for contacting a surface facing axially inwardly of said one wheel to thereby face the respective inwardly facing lateral surface of the opposite wheel of the set. A common support means is provided for the first and second roller means. The common support means carry the first and second roller means of said one wheel so that all axial force components effective on said one wheel during the milling or turning operation are taken up by the common support means. More specifically, the common support means, for example, in the form of a housing, make sure that all axial forces that may be originated by the rollers contacting the wheel circumference are short-circuited, so to speak, within the common housing and that all other axial forces or force components are introduced through the common housing into the machine bed. Thus, the invention prevents any bending or shifting forces from being effective on the wheel set.

Preferably, the common support means such as a housing is displaceable in its position in a direction extending parallel to the rotational axis of the wheel set. This feature makes it possible to adapt the milling machine according to the invention to different wheel gauges or wheel spacings in an especially simple manner.

Preferably, the rollers are arranged in pairs so that each pair of rollers comprises a roller adapted for contacting a wheel circumference and a roller adapted for contacting an inwardly facing lateral wheel surface. This type of structure takes up the axial force components, with the exception of the cutting force components, at the location where these axial force components are generated, whereby these axial force components are prevented from exerting a moment load on the respective wheel disk.

The just defined pairs of rollers are located in a common support or housing, whereby it becomes possible to achieve the advantages of the invention even if other pairs of rollers are supported by their respective independent support member or housing. By arranging the rotational axes of the first and second roller means at right angles to each other it becomes possible to use especially simple rollers. The journal pin or rotational axis of the second roller means which contact a lateral wheel surface may take up different angular positions within the plane extending at right angles to the rotational axis of the first roller means contacting the wheel circumference. Arresting means are provided for locking the adjustable journal of the second roller means in any desired angular position around the rotational axis of the first roller means. In this manner it is possible to locate the roller means so that optimal roller contact conditions are maintained for the second roller means contacting the inwardly facing lateral surface of a wheel.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

In this disclosure the first roller means contact a wheel circumference. The second roller means contact a lateral, axially facing wheel surface. First and second roller means form a group and there is at least one roller group provided for each wheel of a set of wheels to be trued.

Figure 1:
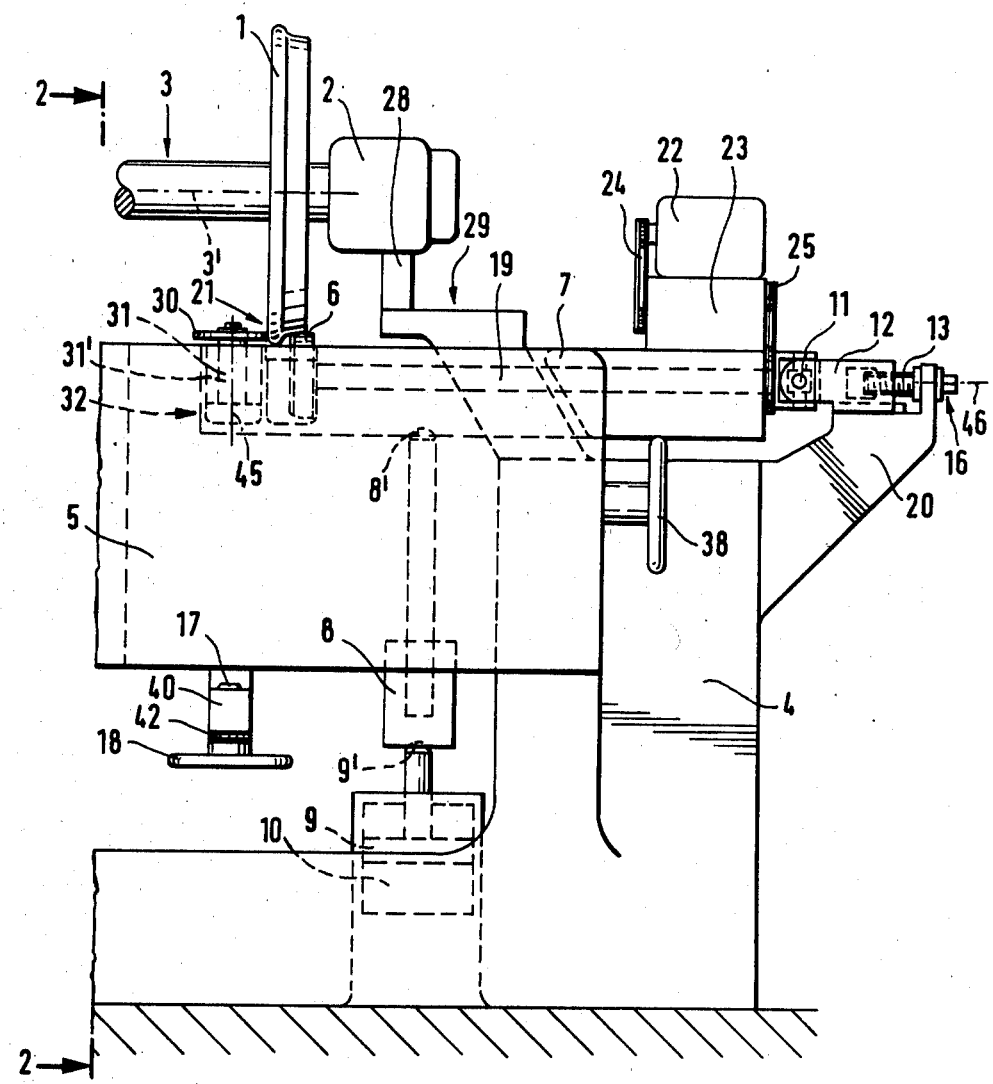
FIG. 1 shows a side view of one half of a milling machine according to the invention constructed for below floor installation.
Figure 2:
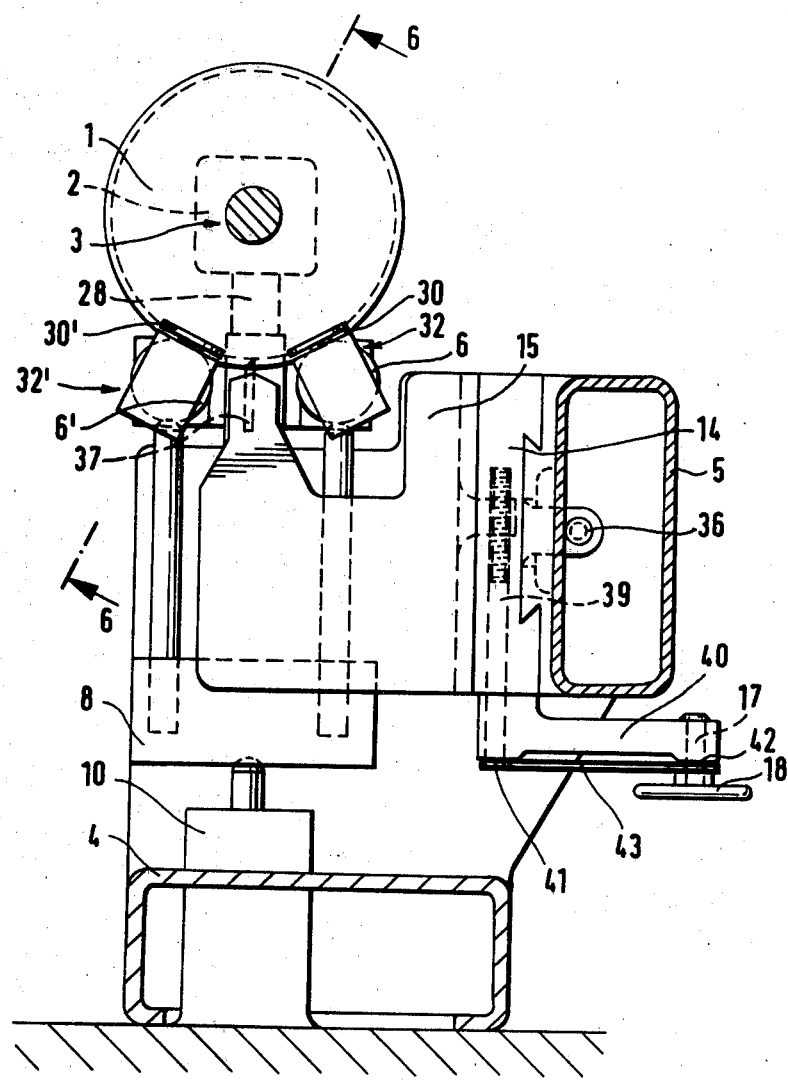
FIG. 2 shows a sectional view along section line 2—2 in FIG. 1.
Figure 3:
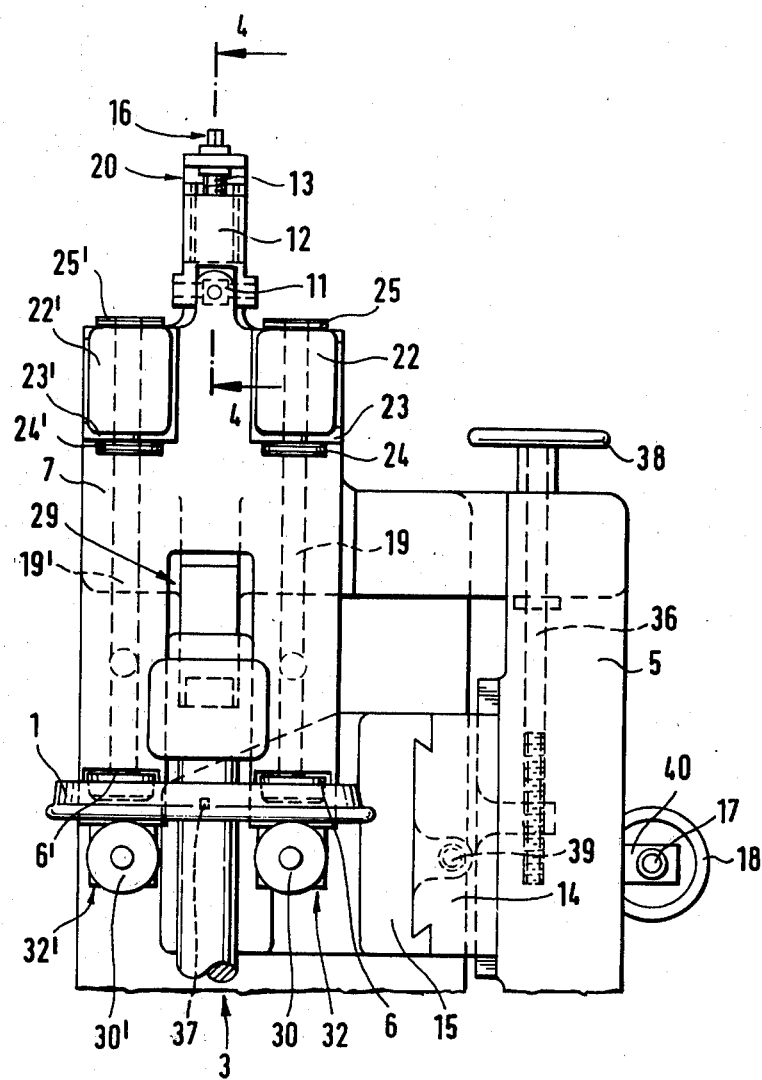
FIG. 3 shows a top plan view of the right-hand half of the milling machine according to FIG. 1.
Figure 4:
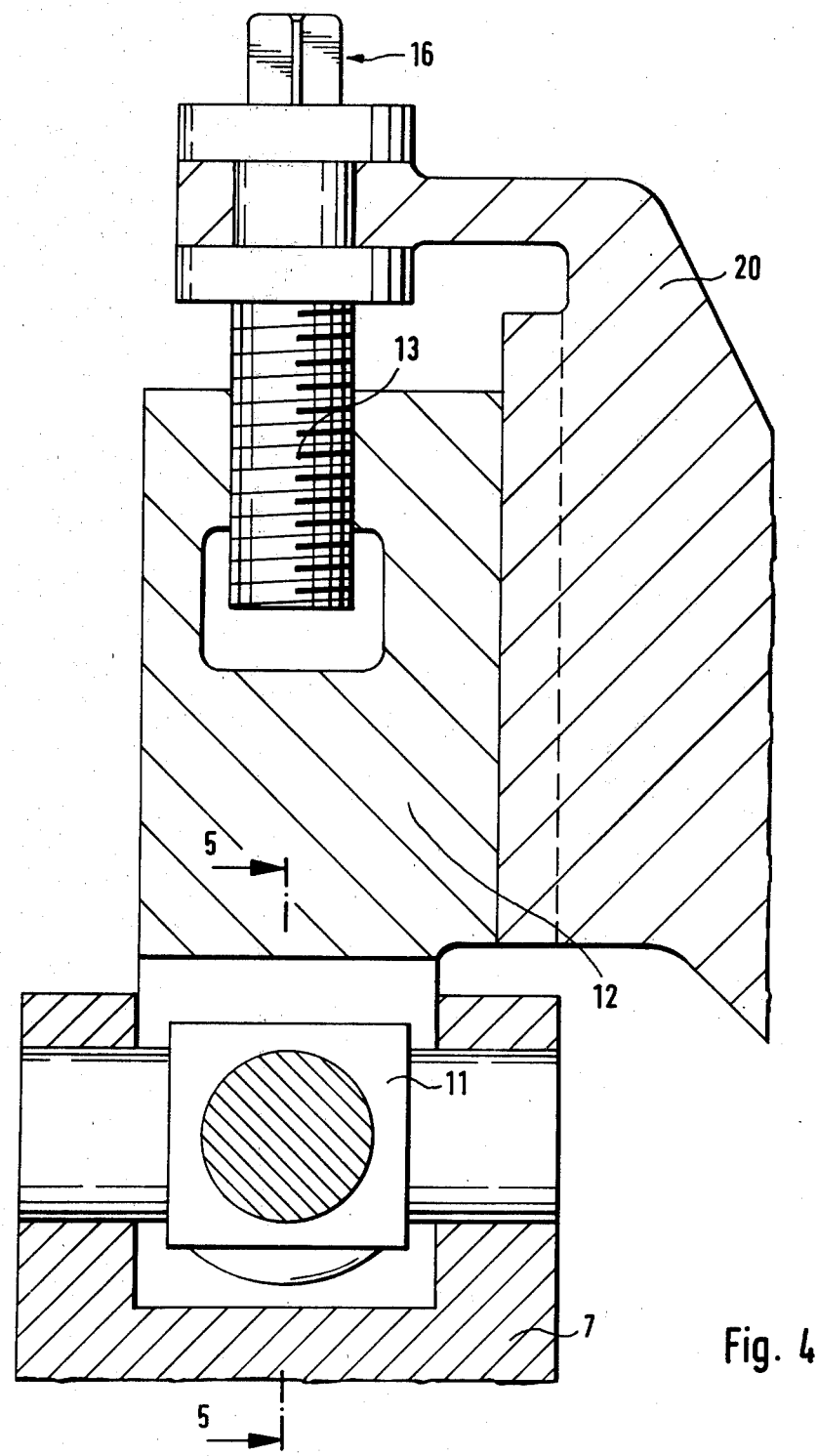
FIG. 4 illustrates on an enlarged scale a sectional view along section line 4—4 in FIG. 3 through the drive means for the longitudinal displacement of a roller combination comprising first and second roller means on one side of the machine.
Figure 5:
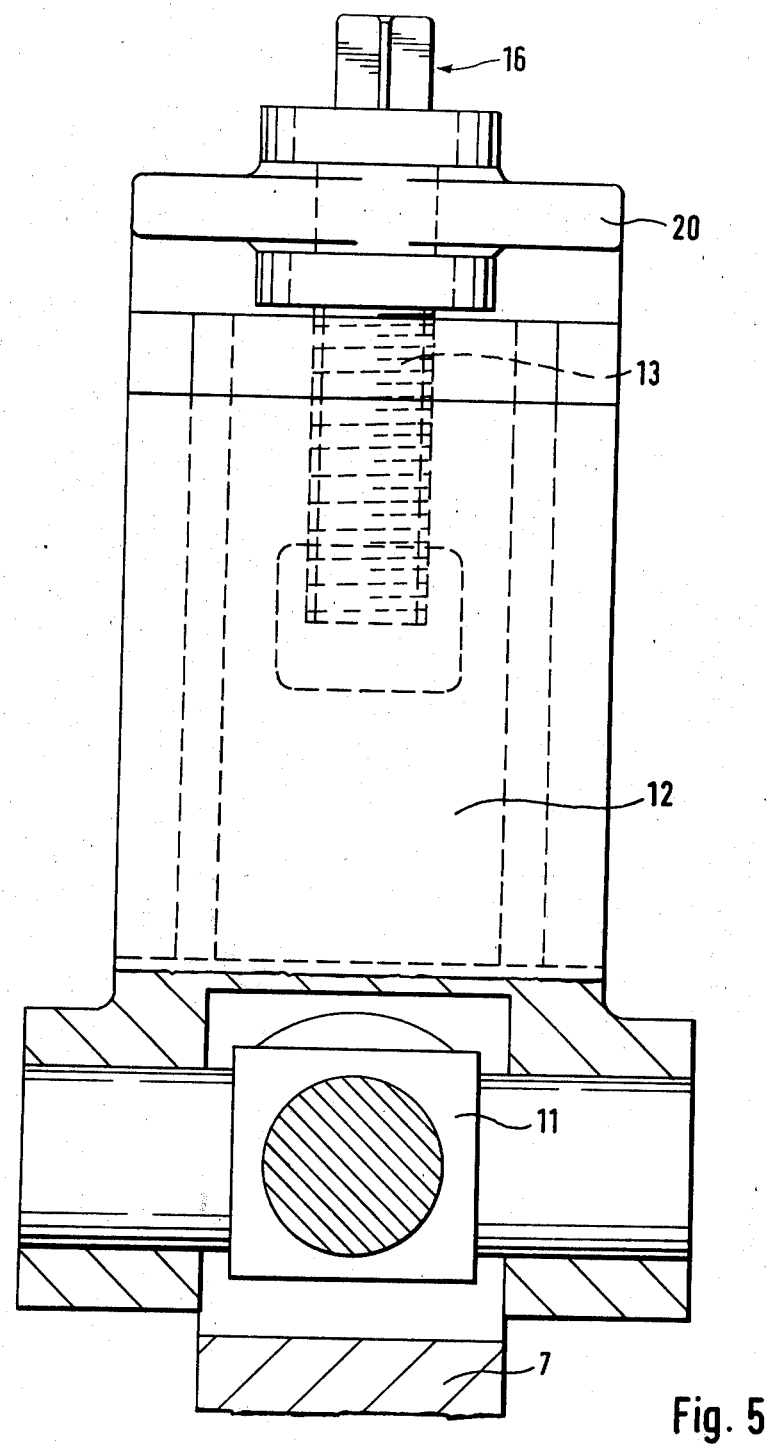
FIG. 5 is a sectional view along section line 5—5 in FIG. 4 further illustrating the drive means for the longitudinal displacement of the roller combination according to FIG. 4 showing the top plan view thereof.

Since the present machine is of a substantially mirror-symmetrical construction relative to a central plane, FIG. 1 shows only the right-hand half of a machine. A wheel set 3 comprises an axle with a rotational axis 3' and two wheels 1. Only the right-hand wheel 1 is shown. The axle is supported for rotation in a bearing housing 2 secured by brackets 28 to the machine bed 4. The bracket 28 may be supported on a rigid platform 29, for example, forming an integral, cast component of the machine bed 4.

First roller means 6, 6' contact a portion of the circumference of the wheel 1. The first roller means 6, 6' may function as support rollers and also as drive rollers. The first roller means 6, 6' are operatively supported by or secured to drive shafts 19, 19' which are supported for rotation and axial displacement by a roller carrier or housing 7. A sprocket wheel is secured to each rear end of each drive shaft 19, 19'. The shafts are thus driven through drive chains 25, 25' which run over respective sprocket wheels of the gear drive shaft extending out of the gear drive means 23, 23'. The gear drive means 23, 23' are secured to the roller carrier 7. A respective motor 22, 22' is secured on the housing of the gear drives 23, 23'. A sprocket wheel is secured to the shaft of the motors 22, 22'. Such sprocket wheel drives the input shaft of the gears 23, 23' through respective chains 24, 24'.

The rear end of the support or roller carrier member 7 is supported in a vertical stud of a universal joint 11. The horizontal stud of the universal joint 11 is supported in a slide 12 which is arranged in a displaceable manner on an outrigger 20 secured to the machine bed 4. The displacement of the slide 12 is accomplished by means of a threaded spindle 13 which is rotatably supported in the outrigger arm 20, but secured against axial displacement. The spindle 13 is driven, for example, by means of a key or wrench not shown, but arranged for cooperation with the square end 16 of the spindle 13.

The front end of the roller carrier 7 is supported by two rods which in turn are secured to an upright post 8. The post 8 in turn is supported by a piston rod of the piston 9. The piston 9 slides in a cylinder 10 which is secured to a pedestal on the foundation. The free ends of the rods held in post 8 and the free end of the piston rod 9 have hemispherical shapes 8' and 9' so that these ends may rest in respective recesses of the roller carrier 7 and of the post 8.

According to the invention the roller carrier 7 constitutes a common support for the above mentioned first roller means 6, 6' as well as for second roller means 30, 30' which contact an axially inwardly facing lateral surface 21 of the wheel 1. The second roller means 30, 30' are rigidly secured to journal studs 31, 31' which are rotatably supported in an extension 32, 32' of the roller carrier 7. These studs 31, 31' are also secured against axial displacement. The rotational axes 45 of the studs 31, 31' extend in a plane extending at right angles to the rotational axes 46 of the drive shaft 19 for the rollers 6, 6'. The rotational axes of the studs 31, 31' have such a direction that they approximately intersect the rotational axis 3' of the wheel set 3 and the rotational axes 46 of the drive shaft 19, 19'. The rotational axes 45 thus extends in a plane extending substantially in parallel to the plane defined by the disk of the wheel 1. The front end of the roller carrier 7 with its support and drive rollers is tiltable in a plane extending approximately in parallel to the above mentioned plane defined by the disk of the wheel 1. The center of this pivoting movement or tilting movement of the roller carrier 7 is defined by the center of the recess forming a ball socket in the post 8 in which the hemispherical upper end 9' of the piston rod of the piston 9 is received. Additionally, the roller carrier 7 performs a tilting movement about the horizontal axis of the universal joint 11. The just described tilting movements of the roller carrier 7 and thus of the support and drive rollers 6, 6' take place in response to balance deviations in the circumferential surface of the wheels 1.

A support carrier 5 is secured to the machine bed 4. A longitudinal slide 14 slides in respective longitudinal guides of the support carrier 5. The longitudinal slide 14 in turn is provided with cross guides in which a cross slide 15 is slidable. The turning or milling tool 37 is secured to the cross slide 15. The longitudinal slide 14 is displaced by means of a threaded spindle 36 which is rotatably supported in the support carrier 5 but secured against axial displacement. The threaded spindle 36 is rotated by means of a hand wheel 38 secured to the threaded spindle 36. The cross slide is displaced by a threaded spindle 39 which is rotatably supported in a bearing block 40 on the longitudinal slide 14. However, the threaded spindle 39 is secured against axial displacement. The bearing block 40 further carries a hand wheel shaft 17 in a rotatable manner, however, secured against axial displacement. A sprocket wheel 41 is secured on the threaded spindle 39 and a sprocket wheel 42 is secured on the hand wheel shaft 17. The hand wheel shaft 17 and the threaded spindle 39 are operatively interconnected in a driving manner by means of a chain 43. A hand wheel 18 is secured to one end of the hand wheel shaft 17.

The function or operation of the above mentioned second roller means comprising the rollers 30, 30' is as follows. In this connection it should be noted that the function is the same at both ends of the machine. The wheel set 3 is lifted off the rails by means of the support and drive rollers 6, 6' and supported by the bracket 28 in its bearing 2. The arrangement is such, that the bracket 28 takes up about 10% of the load caused by the weight of the wheel set, whereas the support and drive rollers 6, 6' take up 90% of that load. The wheel set 3 takes up the position shown in FIG. 1, however, the second roller means 30, 30' are still spaced about 10 mm from the inwardly facing lateral surface 21. Now the wheel set 3 is rotated by the rotation of the drive and support rollers 6, 6' and the spindle 13 of the illustrated one half of the machine is operated to such an extent that the roller means 30, 30' come into contact with the inwardly facing lateral surface 21 of the wheel 1. The same operation is performed on the opposite side. Therefore, the wheel set 3 is secured against axial displacement as soon as both second roller means contact the respective inwardly facing lateral surface 21. However, the arrangement is such that the axial forces exerted by the second roller means are negligibly small. Axial forces which do not result from the cutting force components are taken up within the roller system for each individual wheel of the wheel set 3. Thus, these forces are not effective outwardly onto the roller carrier 7. Axially effective cutting force components have an effect on the roller carrier 7, however, not on the wheel 1 so that the wheel 1 is free of any bending moment loads. This is considered to be a substantial advantage of the apparatus according to the invention.

Figure 6:
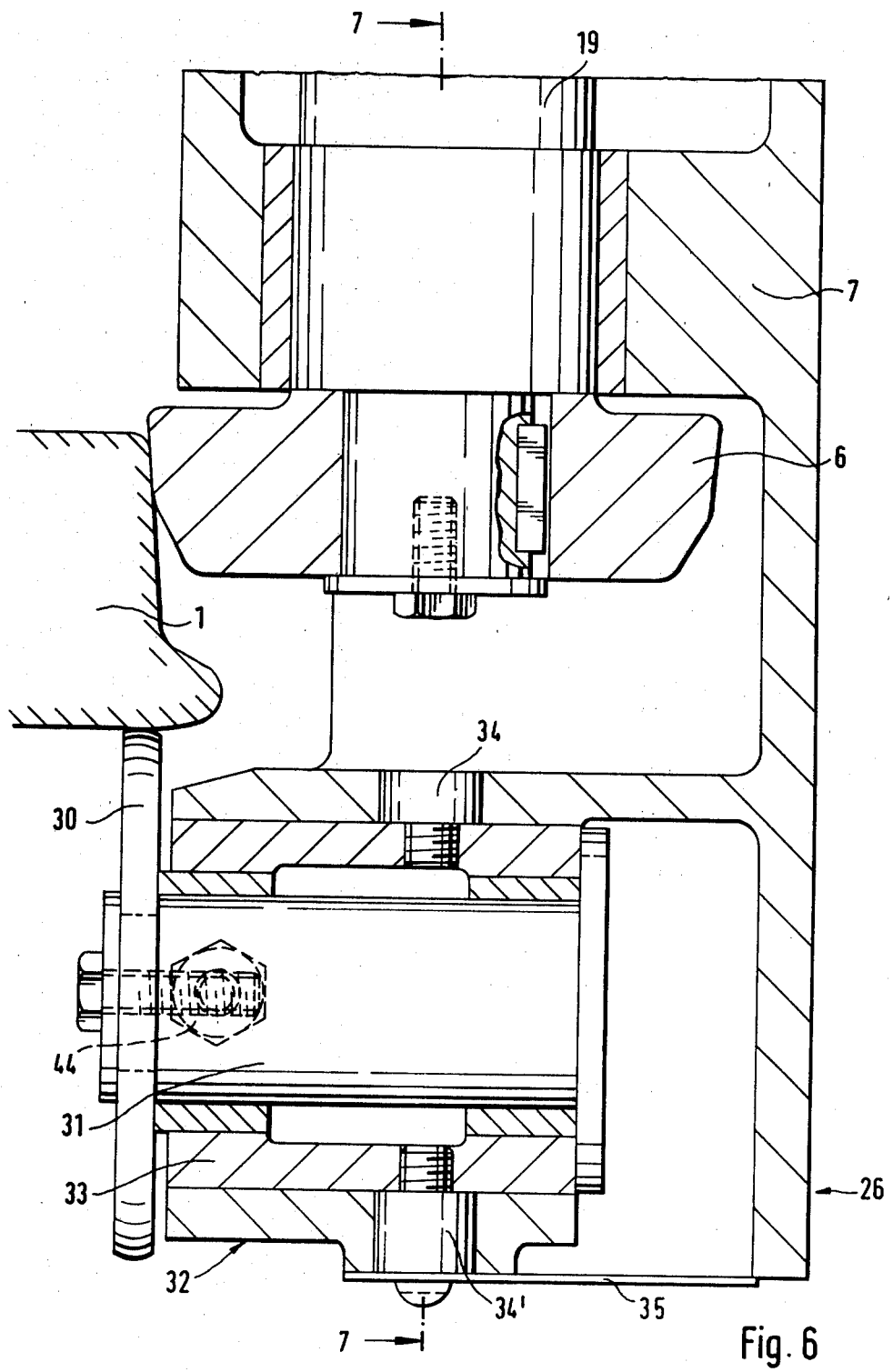
FIG. 6 is a sectional view along section line 6—6 in FIG. 2 showing the details of the common support or housing means for a roller combination.
Figure 7:
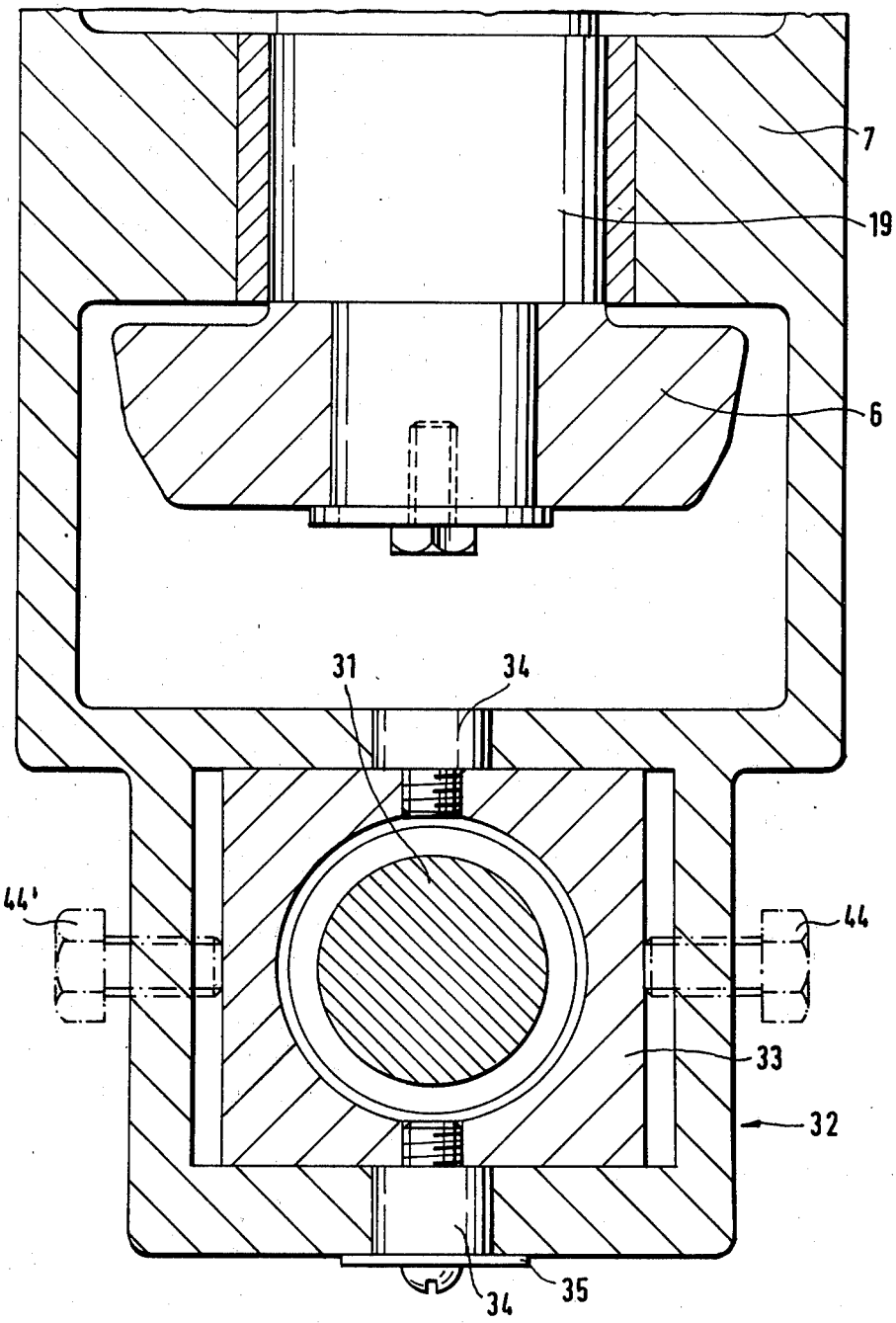
FIG. 7 shows the support means in a sectional view along section line 7—7 in FIG. 6 for a roller combination, whereby the section basically reveals a plan view of the support means.
Figure 8:
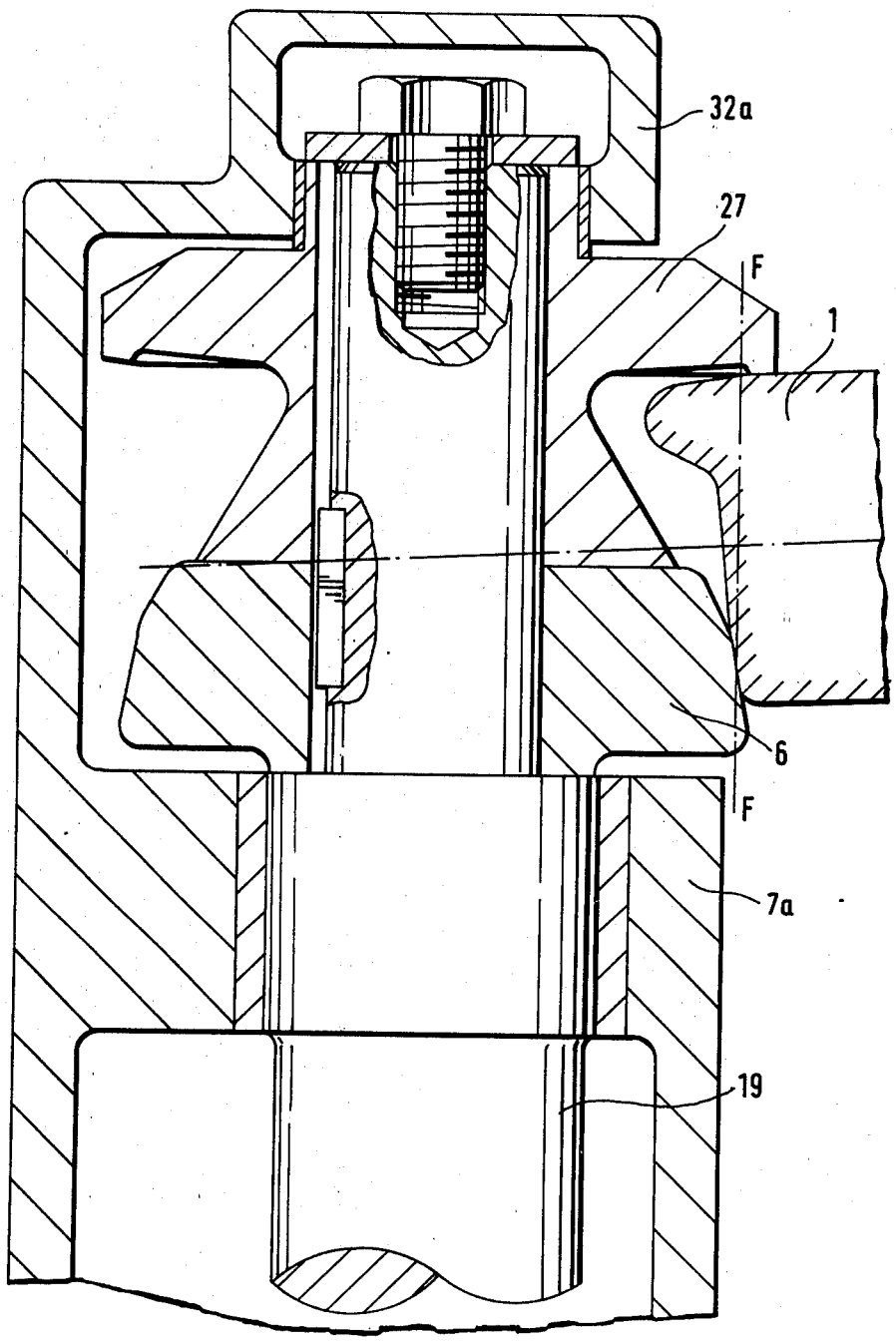
FIG. 8 is a sectional view through a modification of the support means for a roller combination according to the invention.

As shown in FIGS. 6, 7 and 8 the drive rollers 6 have a conical surface contacting the circumference of a wheel 1 so that the smaller diameter of a drive roller 6 faces toward the respective roller 30 of a pair. This conical surface of a roller 6 helps urging a wheel 1 toward the respective roller 30.

The just described taking up of axial forces within the roller system, as far as these axial forces are not caused by the cutting forces, is referred to as a short-circuiting of these axial forces. Accordingly, the roller carrier 7 is required to merely take up the axially effective components of the cutting forces as far as the cutting force components do not compensate one another if they are oppositely directed. Thus, it would be possible to replace the spindle 13 for one machine half by a hydraulic piston cylinder arrangement, whereby the piston thereof would slide in a cylinder forming a structural unit with the corresponding roller carrier 7. Due to the fact that the axial forces effective on the roller carrier 7 are small, it would be possible to select the power of such a hydraulic drive to be very small so that the contacting between the rollers 30, 30' and the respective inwardly facing wheel surface 21 would be facilitated by such a hydraulic drive without exerting any bending forces on the wheels 1 of the wheel set 3 worth mentioning.

If it is necessary that the machine must be capable of taking up wheel sets of small, as well as of very large diameters, then the position of the axis 45 of the second roller means 30, 30' in the plane extending in parallel to the inner lateral surface 21 of the wheel 1 will deviate substantially from a rated or required position. FIGS. 6 and 7 illustrate an embodiment for the support means of the second roller means 30, 30' which will assure that the rotational axis 45 of the rollers 30, 30' will remain in a rated or required position at all times independently of the diameter of the wheels to be trued. The journal studs 31, 31' are supported in respective housings 33 for rotation, but secured against axial displcement. Only one roller pair is shown in the example embodiment for simplicity's sake. However, the other roller pair is supported exactly in the same manner.

Two journal pins 34, 34' are secured to the housing 33. The journal pin 34, 34' are tiltable in the extension 32 of the roller carrier 7 and are supported so as to be secure against axial displacements. The axes of the journal pins 34, 34' and the axes 46 of the drive shaft 19 are coaxial to one another. The journal pin 34' carries an indicator means such as a pointer 35 which indicates on a scale on the facing surface of the wall 26 the angular position of the journal pin 34, 34' around the axis 46. The scale on the wall 26 carries indications of the measured diameter of the wheel sets in accordance with which the second roller means 30 are to be adjusted. The screws 44, 44' may be loosened for the adjustment and tightened for arresting or locking the housing 33 in an adjusted position.

FIG. 8 shows a further embodiment of a common roller support means according to the invention. A roller 27 is arranged on an extension 32a so that the axis of rotation of the roller 27 and the axis of rotation of the support and drive roller 6 coincide or are coaxial to each other. Thus, both rollers 27 and 6 are supported in a roller carrier 7a by means of a drive shaft 19. The plane surface of the roller 27 contacts the inner lateral wheel surface 21 of the wheel 1, whereby the roller 27 has such a shape that it avoids contacting the inner flank of the wheel rim.

The advantage of the arrangement shown in FIG. 8 is seen particularly in the compact and simple structure as well as in the fact that the roller 27 may be a driving roller. Corresponding, axially directed forces are desirable in this embodiment in order to make the driving effect of the roller 27 efficient. It is advantageous or suitable to provide the wheel contacting surface of the roller 27 with a conical angle selected within the range so that the center of the wheel contacting surface of the roller 27 and the center of the wheel contacting surface of the roller 6 fall into a common axis F—F as shown in FIG. 8 as long as the respective wheel set has a new profile. This type of roller combination has been found to work without fail even in connection with profiles in which the inner wheel rim flank is not conical but rather plane. A still further advantage of the arrangement of FIG. 8 is seen in that the speeds of the circumferences of the rollers 27 and 6 are substantially equal at the center of the contact surfaces so that small friction losses occur.

Although the invention has been described with reference to specific example embodiments, it will be appreciated, that it is intended, to cover all modifications and equivalents within the scope of the appended claims.

What is claimed is:

1. A lathe machine for turning wheel sets having a common axis, comprising two groups of rollers, at least one roller group being provided for each wheel of a set, each roller group comprising first support roller means (6, 6') for contacting the circumference of one wheel of said wheel set, second roller means (30, 30') for contacting a wheel surface facing axially inwardly of said one wheel, said first and second roller means of a group being arranged in pairs, each pair comprising a wheel circumference contacting support roller and an axially inwardly facing wheel surface contacting roller, each roller group further comprising common support means (7, 32) for said first and second roller means, said common support means carrying the first and second roller means of a group with a rigid fixed relationship between the first and second roller means of a group so that all axial force components are taken up by said common support means and the wheel set is secured against axial displacement by short circuiting of these axial force components in each pair of rollers independently of the other pair.

2. The lathe machine of claim 1, further comprising positioning means operatively connected to said common support means for axially displacing said common support means in parallel to said common axis for bringing said second roller means into contact with the respective axially inwardly facing surface of the corresponding wheel of a wheel set.

3. The lathe machine of claim 1, wherein said first roller means comprise first journal means, wherein said second roller means comprise second journal means, and wherein said first and second journal means are operatively arranged in said common support means so that the rotational axes of said first and second journal means extend at right angles relative to each other.

4. The lathe machine of claim 3, wherein said second jouranl means comprise third journal means operatively securing said second journal means for rotation about the journal axis of said first journal means, and position arresting means operatively arranged for arresting said second journal means in an adjusted position, whereby the rotational axis of said second jouranl means extending perpendicularly to said rotational axis of said first journal means is adjustable for taking up angular positions around said rotational axis of said first journal means.

5. The lathe machine of claim 4, further comprising indicator means operatively connected to said second journal means for indicating the angular position of said second journal means around the rotational axis of said first journal means.

6. The lathe machine of claim 1, wherein said first and second roller means are drive roller means and/or support roller means.

7. The lathe machine of claim 1, wherein said first wheel circumference contacting roller means (6) comprises a conical surface for contacting said wheel circumference, said conical surface providing a smaller diameter roller end and a larger diameter roller end, said smaller diameter roller end facing toward the second roller means (30) of a group for urging a wheel of a set toward said second roller means (30).

8. A lathe machine for turning wheel sets having a common axis, comprising two groups of rollers, at least one roller group being provided for each wheel of a set, each roller group comprising first support roller means (6, 6') for contacting the circumference of one wheel of said wheel set, second roller means (30, 30') for contacting a wheel surface facing axially inwardly of said one wheel, said first and second roller means of a group being arranged in pairs, each pair comprising a wheel circumference contacting support roller and an axially inwardly facing wheel surface contacting roller, each roller group further comprising common support means (7, 32) for said first and second roller means, said common support means carrying the first and second roller means of a group with a rigid fixed relationship between the first and second roller means of a group so that all axial force components are taken up by said common support means and the wheel set is secured against axial displacement by short circuiting of these axial force components in each pair of rollers independently of the other pair, said lathe machine further comprising positioning means (12, 13) operatively connected to at least one of said common support means for axially displacing said common support means in parallel to said common axis for bringing said second roller means into contact with the respective axially inwardly facing surface of the corresponding wheel of a wheel set.

9. The lathe machine of claim 8, wherein said first wheel circumference contacting roller means (6) comprises a conical surface for contacting said wheel circumference, said conical surface providing a smaller diameter roller end and a larger diameter roller end, said smaller diameter roller end facing toward the second roller means (30) of a group for urging a wheel of a set toward said second roller means (30).

* * * * *

UNITED STATES PATENT AND TRADEMARK OFFICE
CERTIFICATE OF CORRECTION

PATENT NO. : 4,399,724

DATED : August 23, 1983

INVENTOR(S) : Theodor Dombrowski

It is certified that error appears in the above-identified patent and that said Letters Patent is hereby corrected as shown below:

On the first page "[73] Assignee: Wilhelm Hegenscheidt Gesellschaft mgH, Erkelenz, Fed. Rep. of Germany"

should read: --[73] Assignee: Wilhelm Hegenscheidt Gesellschaft mbH, Erkelenz, Fed. Rep. of Germany--.

In Claim 4, lines 2 and 7 "jouranl" should read --journal--.

Signed and Sealed this

Twenty-fifth Day of October 1983

[SEAL]

Attest:

Attesting Officer

GERALD J. MOSSINGHOFF

Commissioner of Patents and Trademarks